United States Patent
Akihisa (10) Patent No.: US 12,315,169 B2
(45) Date of Patent: May 27, 2025

(54) INFORMATION PROCESSING DEVICE, ANALYSIS METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventor: Daisuke Akihisa, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 440 days.

(21) Appl. No.: 17/981,029

(22) Filed: Nov. 4, 2022

(65) Prior Publication Data
US 2023/0186485 A1    Jun. 15, 2023

(30) Foreign Application Priority Data
Dec. 10, 2021  (JP) .................. 2021-200949

(51) Int. Cl.
*G06T 7/20*    (2017.01)
*G06T 7/70*    (2017.01)
*G06V 20/70*   (2022.01)

(52) U.S. Cl.
CPC .......... *G06T 7/20* (2013.01); *G06T 7/70* (2017.01); *G06V 20/70* (2022.01)

(58) Field of Classification Search
CPC . G06N 99/00; G06T 7/20; G06T 7/70; G06V 20/70
See application file for complete search history.

(56) References Cited

U.S. PATENT DOCUMENTS

2018/0011950 A1*  1/2018  Ishii .................. G06F 30/13

FOREIGN PATENT DOCUMENTS

| JP | 2012-43050 A | 3/2012 |
|---|---|---|
| JP | 2012-243165 A | 12/2012 |
| JP | 2020-166327 A | 10/2020 |
| WO | 2017/046875 A1 | 3/2017 |

* cited by examiner

*Primary Examiner* — Michael J Vanchy, Jr.
(74) *Attorney, Agent, or Firm* — Sughrue Mion, PLLC (57) ABSTRACT

A world in which a moving body moves is analyzed by using a semantic model of the world. A space feature characterizing a space in the world is defined by an item set that at least includes attribute information of a plurality of components present in and around the space. A specific space is a space where the moving body exhibits a characteristic behavior in the world. A specific space feature is the space feature characterizing the specific space. A plurality of components present in and around the specific space in a first world is extracted, and the specific space feature is defined by the item set. Then, a similar space having the space feature similar to the specific space feature regarding the specific space in the first world is extracted from a second world.

9 Claims, 10 Drawing Sheets

| <SPACE FEATURE P> |
|---|
| ATTRIBUTE INFORMATION OF COMPONENT |
| POSITIONAL RELATIONSHIP |
| (SUPPLEMENTARY INFORMATION) ENVIRONMENT CONDITION UNDER WHICH SPACE IS |

INFORMATION PROCESSING DEVICE, ANALYSIS METHOD, AND NON-TRANSITORY COMPUTER-READABLE RECORDING MEDIUM

CROSS-REFERENCE TO RELATED APPLICATION

This application claims priority to Japanese Patent Application No. 2021-200949 filed on Dec. 10, 2021, the entire contents of which are incorporated by reference herein.

BACKGROUND

Technical Field

The present disclosure relates to a technique for analyzing a world in which a moving body moves.

Background Art

Patent Literature 1 discloses a general BIM (Building Information Modeling) model in a field of building design. The BIM model is a collection of objects representing parts of a building. Each object has attribute information. Examples of the attribute information include a type, a position, a size, a material, a color, a price, a quantity, and the like.

LIST OF RELATED ART

Patent Literature 1: Japanese Laid-Open Patent Application Publication No. JP-2020-166327

SUMMARY

A world (e.g., a building, a city) in which a moving body (e.g., a person, a robot) moves is considered. Knowing a space where the moving body exhibits a characteristic behavior is useful in designing a city, a building, and the like comfortable for the moving body. In order to reduce time and cost, a technique capable of efficiently recognizing the space where the moving body exhibits the characteristic behavior is desired.

An object of the present disclosure is to provide a technique capable of efficiently recognizing a space where a moving body exhibits a characteristic behavior.

A first aspect is directed to an information processing device for analyzing a world in which a moving body moves.

The information processing device includes: one or more processors; and one or more memory devices.

The one or more memory devices store semantic model information that is information on a semantic model of the world and indicates attribute information for each component constituting the world.

A space feature characterizing a space in the world is defined by an item set that at least includes the attribute information of a plurality of components present in and around the space.

A specific space is a space where the moving body exhibits a characteristic behavior in the world.

A specific space feature is the space feature characterizing the specific space.

The one or more processors are configured to:
extract, based on the semantic model information regarding a first world, a plurality of components present in and around the specific space in the first world to define the specific space feature by the item set; and
extract a similar space from a second world based on the semantic model information regarding the second world, the similar space having the space feature similar to the specific space feature regarding the specific space in the first world.

A second aspect is directed to an analysis method executed by a computer for analyzing a world in which a moving body moves.

Semantic model information is information on a semantic model of the world and indicates attribute information for each component constituting the world.

A space feature characterizing a space in the world is defined by an item set that at least includes the attribute information of a plurality of components present in and around the space.

A specific space is a space where the moving body exhibits a characteristic behavior in the world.

A specific space feature is the space feature characterizing the specific space.

The analysis method includes:
reading the semantic model information regarding a first world from one or more memory devices;
extracting, based on the semantic model information regarding the first world, a plurality of components present in and around the specific space in the first world to define the specific space feature by the item set;
reading the semantic model information regarding a second world from the one or more memory devices; and
extracting a similar space from a second world based on the semantic model information regarding the second world, the similar space having the space feature similar to the specific space feature regarding the specific space in the first world.

A third aspect is directed to an analysis program, when executed by a computer, causing the computer to execute an analysis process that analyzes a world in which a moving body moves.

Semantic model information is information on a semantic model of the world and indicates attribute information for each component constituting the world.

A space feature characterizing a space in the world is defined by an item set that at least includes the attribute information of a plurality of components present in and around the space.

A specific space is a space where the moving body exhibits a characteristic behavior in the world.

A specific space feature is the space feature characterizing the specific space.

The analysis process includes:
reading the semantic model information regarding a first world from one or more memory devices;
extracting, based on the semantic model information regarding the first world, a plurality of components present in and around the specific space in the first world to define the specific space feature by the item set;
reading the semantic model information regarding a second world from the one or more memory devices; and
extracting a similar space from a second world based on the semantic model information regarding the second world, the similar space having the space feature similar to the specific space feature regarding the specific space in the first world.

According to the present disclosure, using the semantic model information makes it possible to define the specific space feature characterizing the specific space with high accuracy while suppressing the time and cost. Then, using the specific space feature characterizing the specific space makes it possible to efficiently extract a similar space having the feature similar to that of the specific space. That is, it is possible to efficiently recognize the space (i.e., the specific space and the similar space) where the moving body exhibits the characteristic behavior.

EMBODIMENTS

Embodiments of the present disclosure will be described with reference to the accompanying drawings.

1. Defining Specific Space by Using Semantic Model

Figure 1:
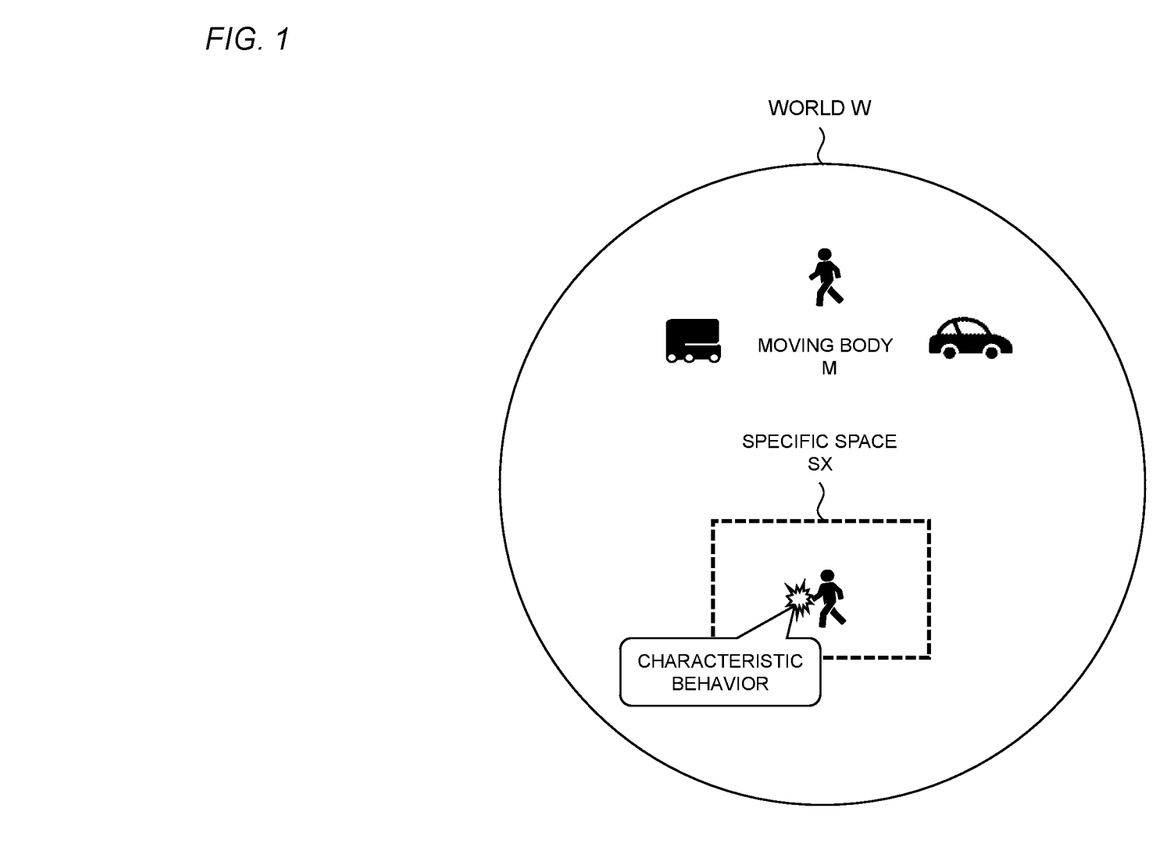
FIG. 1 is a conceptual diagram for explaining a world and a specific space that are targets of analysis in an embodiment of the present disclosure.

FIG. 1 is a conceptual diagram for explaining a "world W" and a "specific space SX" that are targets of analysis in the present embodiment. Examples of the world W include a building, a city (e.g., a smart city), a site of a facility, and the like. There are various objects in the world W. In particular, a moving body M moves in the world W. Examples of the moving body M include a person (pedestrian), a robot, a vehicle, and the like. Examples of the robot include a logistics robot, a working robot, and the like. Examples of the vehicle include a vehicle driven by a human, an autonomous driving vehicle, a motorbike, a bicycle, and the like.

The specific space SX is a partial space in the world W. In particular, the specific space SX is a space where the moving body M exhibits a "characteristic behavior." For example, the specific space SX is a space around a position where a person easily collides with a desk. As another example, the specific space SX is a space around a position where a person easily slips and loses his or her balance. As still another example, the specific space SX is a space where a person frequently holds his or her hand in front of his or her eyes due to feeling of dazzling. As still another example, the specific space SX is a space around a point where a person frequently halts due to feelings of fear or tension. As still another example, the specific space SX is a space around a point where the logistics robot is easily stuck. As still another example, the specific space SX is a space where the vehicle frequently makes a rapid deceleration.

Knowing the specific space SX where the moving body M exhibits the characteristic behavior as described above is useful in designing a city, a building, and the like comfortable for the moving body M. In particular, it is useful to grasp what characteristics the specific space SX has. For example, grasping the characteristics of the specific space SX makes it easier to find a space having similar characteristics. When the specific space SX or a space similar thereto is found in a design stage before actually constructing a building or a city, it is also possible to improve the design in advance.

In view of the above, defining a "space" is considered in the present embodiment. In particular, defining a "feature of space" is considered. In the following description, defining a space and defining a feature of space are used interchangeably.

Figure 2:
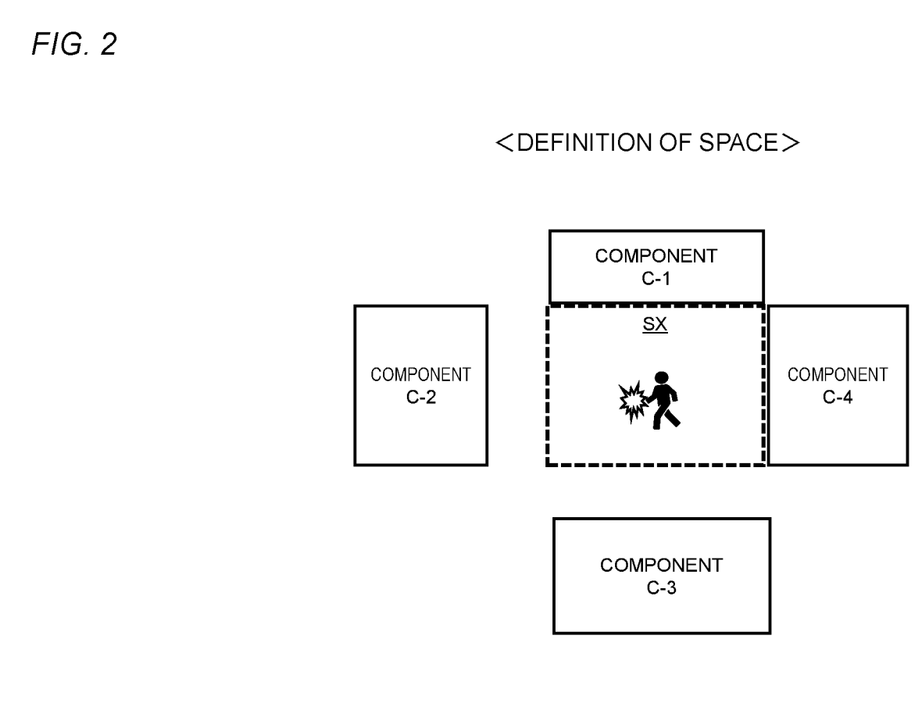
FIG. 2 is a conceptual diagram for explaining a definition of a space in an embodiment of the present disclosure.

FIG. 2 is a conceptual diagram for explaining the definition of the space in the present embodiment. Unlike an object, a space itself has no visible features. Therefore, in order to define a space, at least a "component C" present in and around the space is used. The component C here is a component (element) constituting the world W. Typically, the component C is a stationary object. Examples of the component C of a building include a wall, a floor, a pillar, a ceiling, a door, a chair, a desk, a window, and the like. Examples of the component C outdoor include a terrain, a building, a road, a white line, a sign, a traffic light, a roadside structure, and the like.

A space is characterized by at least the component C present in and around the space. In other words, information on the component C present in and around a space at least serves as information characterizing the space. The space being a definition target and the component C used for defining the space may be in direct contact with each other or may be separated from each other. A positional relationship between the components C and a positional relationship between the space and the component C can also serve as the information characterizing the space. Such the information characterizing the space is hereinafter referred to as a "space feature P." The space feature P characterizing the specific space SX where the moving body M exhibits the characteristic behavior is hereinafter referred to as a "specific space feature PX." Defining a space means defining the space feature P that characterizes the space. For example, defining a specific space SX means defining the specific space feature PX that characterizes the specific space SX.

In order to accurately define the space feature P regarding a space, detailed information on the component C related to the space is necessary. However, it is not always easy to acquire the detailed information on the components C existing in the world W. For example, a data amount of point cloud data representing a structure of the entire world W is extremely large, and thus it requires an enormous amount of time and cost to accurately acquire information on the type, the size, and the like of each component C. As another example, two-dimensional information of the world W is simple graphic information, and it is not possible to automatically determine what each graphic represents, which results in large amounts of time and cost for identifying it.

Figure 3:
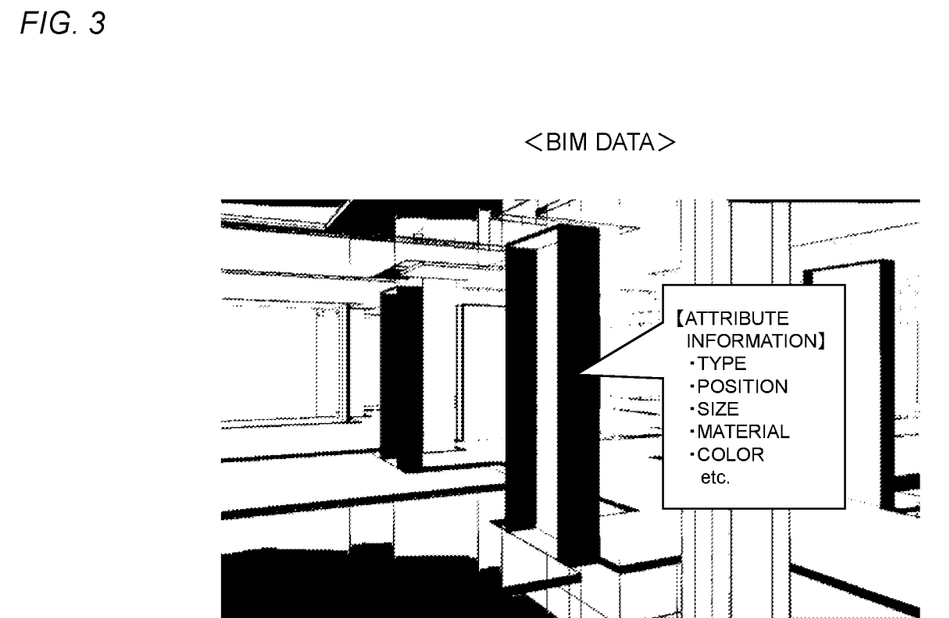
FIG. 3 is a conceptual diagram illustrating an example of a semantic model.

It is desired to define the space feature P with high accuracy while suppressing the time and cost. In view of the above, according to the present embodiment, a "semantic model" regarding the world W is used for defining the space feature P regarding the space in the world W. The semantic model is a 3D model based on an idea such as BIM (Building Information Modeling) and CIM (Construction Information Modeling). However, the semantic model is not a simple 3D model, but includes "attribute information" for each component C constituting the world W. Examples of the attribute information of the component C include a type, a position, a size, a material, a color, and the like of the component C. FIG. 3 illustrates an example of BIM data which is a kind of the semantic model.

Using such the semantic model makes it possible to easily acquire the attribute information of a plurality of components C related to a space. Then, using at least the attribute information of the plurality of components C makes it possible to accurately define the space feature P characterizing the space. Moreover, information other than the attribute information of the component C may be additionally used for defining the space feature P. To generalize, the space feature P is defined by an "item set."

Figure 4:
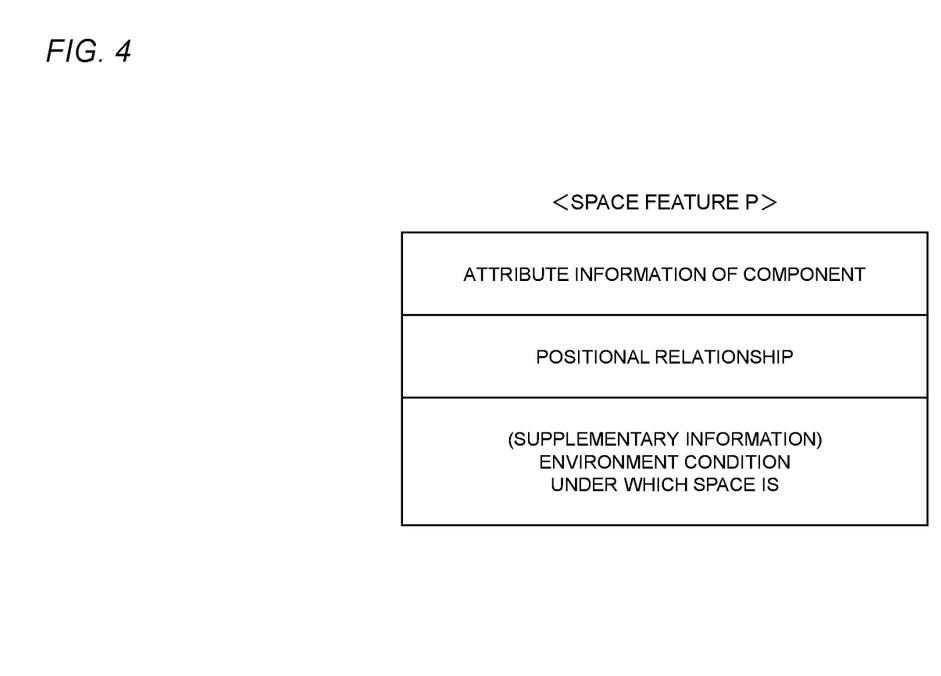
FIG. 4 is a conceptual diagram for explaining an example of an item set that defines a space feature in an embodiment of the present disclosure.

FIG. 4 is a conceptual diagram for explaining an example of the item set that defines the space feature P.

(1) Attribute Information

The item set defining the space feature P includes at least the attribute information of each of a plurality of components C present in and around the space being the definition target. The attribute information of the component C also includes one or more items. Examples of the items constituting the attribute information of the component C include a type, a position, a size, a material, a color, and the like.

Examples of the definition based on such the items are as follows.

<Definition example 1> A height of a desk adjacent to the space is  m, a color thereof is , and a material thereof is **.

<Definition example 2> A color of a floor below the space is , and a material thereof is .

<Definition example 3> A height of a ceiling above the space is ** m.

<Definition example 4> The number of windows visible from the space is , and a size of the window frame is  m×** m.

(2) Positional Relationship

The item set defining the space feature P may include a positional relationship between the space being the definition target and at least one component C. The item set defining the space feature P may include a positional relationship between at least two components C. Examples of the definition based on such the items are as follows.

<Definition example 5> The space ** m away from an entrance door of a room.

<Definition example 6> A distance from a ceiling lighting closest to the space is ** m.

<Definition example 7> A desk having a height of  m is  m away from a wall having a color of  and a material of .

(3) Environmental Condition

The item set defining the space feature P may include, as supplementary information, an environmental condition under which the space being the definition target is placed. The environmental condition also includes one or more items. Examples of the items constituting the environmental condition include a temperature, a humidity, an illuminance, a wind direction, a wind power, a season, an hour, a floor state (dry/wet), a distribution density of surrounding people, a duration of sunshine, a change in sunshine, whether or not it is a moving route of a specific moving body M, and the like. Examples of the definition based on such the items are as follows.

<Definition example 8> The space gets an afternoon sun through a window (specific season/specific hour).

<Definition example 9> The space goes into a shadow of a building (specific season/specific hour)

<Definition example 10> Strong winds blowing through buildings blow into the space.

<Definition example 11> There is a floor that has a negative impact on a wet shoe sole during rainy weather.

<Definition example 12> The space is a movement path of a logistics robot.

<Definition example 13> The space is used by elderly people having poor eyesight or the like.

In this manner, the space feature P characterizing the space is defined by the item set. The specific space feature PX characterizing the specific space SX also is defined by the item set. It can be said that the item set defining the specific space feature PX represents factors causing the moving body M to exhibit the characteristic behavior.

It should be noted that there is no need to use an unrelated component C far away from the space for defining the space feature P regarding the space. A range from which the component C used for defining the space feature P is extracted is hereinafter referred to as a "component extraction range RNG."

Figure 5:
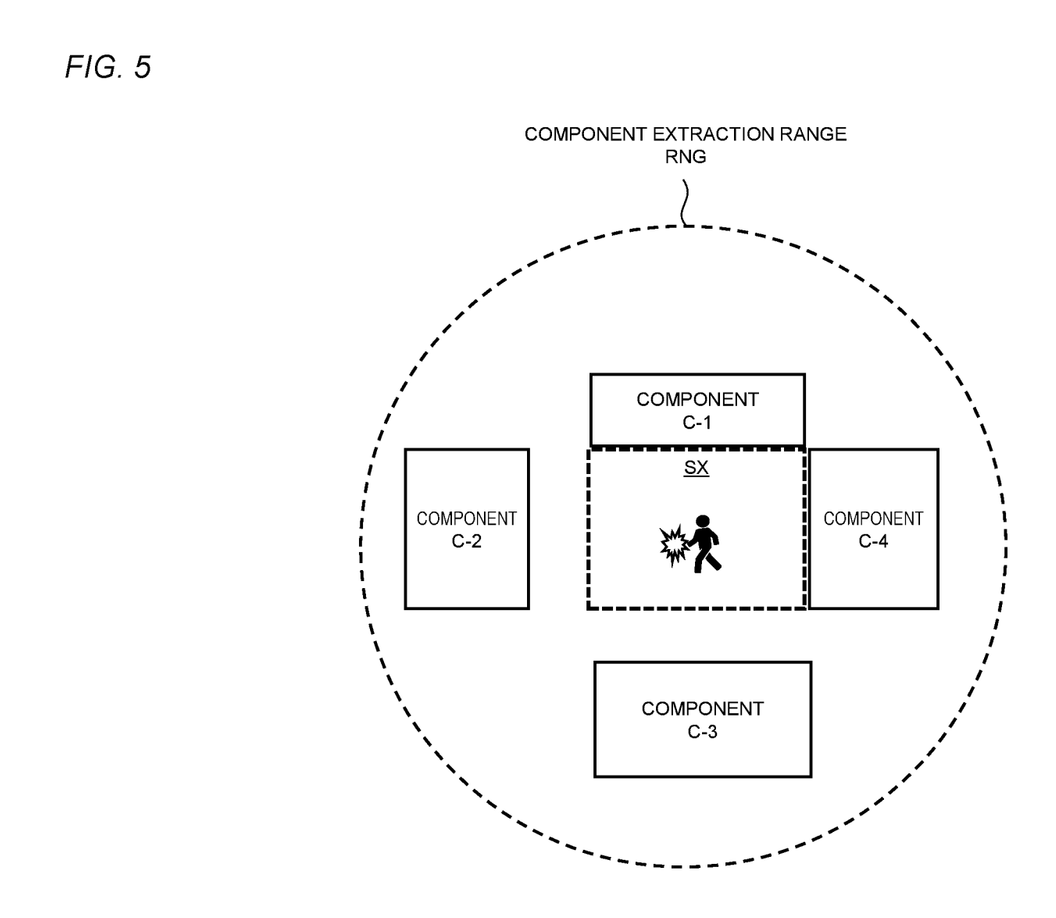
FIG. 5 is a conceptual diagram for explaining a component extraction range in an embodiment of the present disclosure.

FIG. 5 is a conceptual diagram for explaining the component extraction range RNG. The component extraction range RNG is a range including the space (e.g., the specific space SX) being the definition target. For example, the component extraction range RNG is a range within a predetermined distance from a representative point in the space being the definition target. The representative point is, for example, a center position of the space being the definition target. As another example, the representative point may be specified by a user. The predetermined range is, for example, 10 m. A finite number of components C for defining the space feature P characterizing the space are extracted from the component extraction range RNG including the space being the definition target.

Moreover, when extracting the component C for defining the space feature P, a field of view (eyesight) or a blind spot of the moving body M may be taken into consideration. The reason is that the component C invisible from the moving body M may not affect the behavior of the moving body M. For example, the component C invisible from the moving body M (in the blind spot of the moving body M) existing in the space being the definition target may not be used for defining the space feature P of the space. In other words, the component C used for defining the space feature P of a space may be the component C that are in sight of the moving body M existing in the space. Preventing the number of components C used for the definition from increasing more than necessary makes it possible to reduce processing load.

According to the present embodiment, as described above, the space in the world W is defined by the use of the semantic model. In general, the semantic model is used for managing parts of a building in a building design field. However, according to the present embodiment, a "space" rather than an "object" is defined by using such the semantic model. Using the semantic model makes it possible to define the space feature P characterizing the space with high accuracy while suppressing the time and cost. That is, it is possible to efficiently and highly accurately define the space feature P.

In particular, according to the present embodiment, the specific space SX where the moving body M exhibits the characteristic behavior is defined. Using the semantic model makes it possible to define the specific space feature PX characterizing the specific space SX with high accuracy while suppressing the time and cost. That is, it is possible to efficiently and highly accurately define the specific space feature PX.

Defining the space based on the semantic model described above is implemented by a computer. Hereinafter, information processing by the computer according to the present embodiment will be described in detail.

2. Information Processing Device

Figure 6:
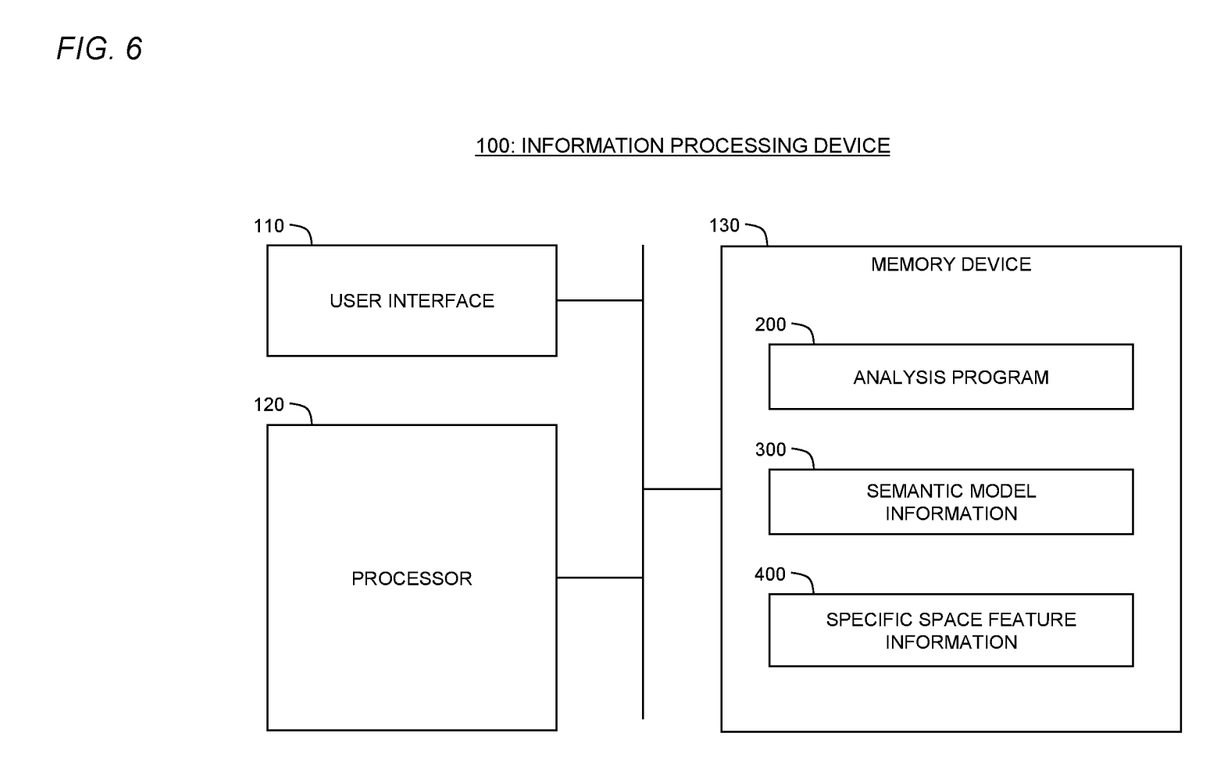
FIG. 6 is a block diagram showing a configuration example of an information processing device according to an embodiment of the present disclosure.

FIG. 6 is a block diagram showing a configuration example of an information processing device 100 according to the present embodiment. The information processing device 100 is a computer that executes a variety of information processing.

The information processing device 100 includes a user interface 110. The user interface 110 receives an input of information from a user, and provides the user of a variety of information. The user interface 110 includes an input device and an output device. Examples of the input device include a keyboard, a mouse, a touch panel, and the like. Examples of the output device include a display device, a touch panel, a speaker, and the like. The user interface 110 may be a GUI (Graphical User Interface).

The information processing device 100 further includes one or more processors 120 (hereinafter simply referred to as a processor 120) and one or more memory devices 130 (hereinafter simply referred to as a memory device 130). The processor 120 executes a variety of processing. For example, the processor 120 includes a CPU (Central Processing Unit). The memory device 130 stores a variety of information necessary for the processing by the processor 120. Examples of the memory device 130 include a volatile memory, a nonvolatile memory, an HDD (Hard Disk Drive), an SSD (Solid State Drive), and the like.

An analysis program 200 is a computer program that is executed by the processor 120. Functions of the information processing device 100 are implemented by the processor 120 executing the analysis program 200. The analysis program 200 is stored in the memory device 130. Alternatively, the analysis program 200 may be recorded on a non-transitory computer-readable recording medium. The analysis program 200 may be provided via a network.

Semantic model information 300 is information on the semantic model of the world W being the analysis target. As described above, the semantic model includes the attribute information for each of the components C constituting the world W. The environmental condition (i.e., the supplementary information) for each position may be associated with the semantic model. In that case, the semantic model information 300 includes the semantic model and the environmental condition (i.e., the supplementary information) associated with the semantic model. The semantic model information 300 is generated in advance and stored in the memory device 130.

Specific space feature information 400 is information that defines the specific space feature PX characterizing the specific space SX. The specific space feature information 400 is generated by a "specific space definition process" described below, and stored in the memory device 130.

3. Specific Space Definition Process

Figure 7:
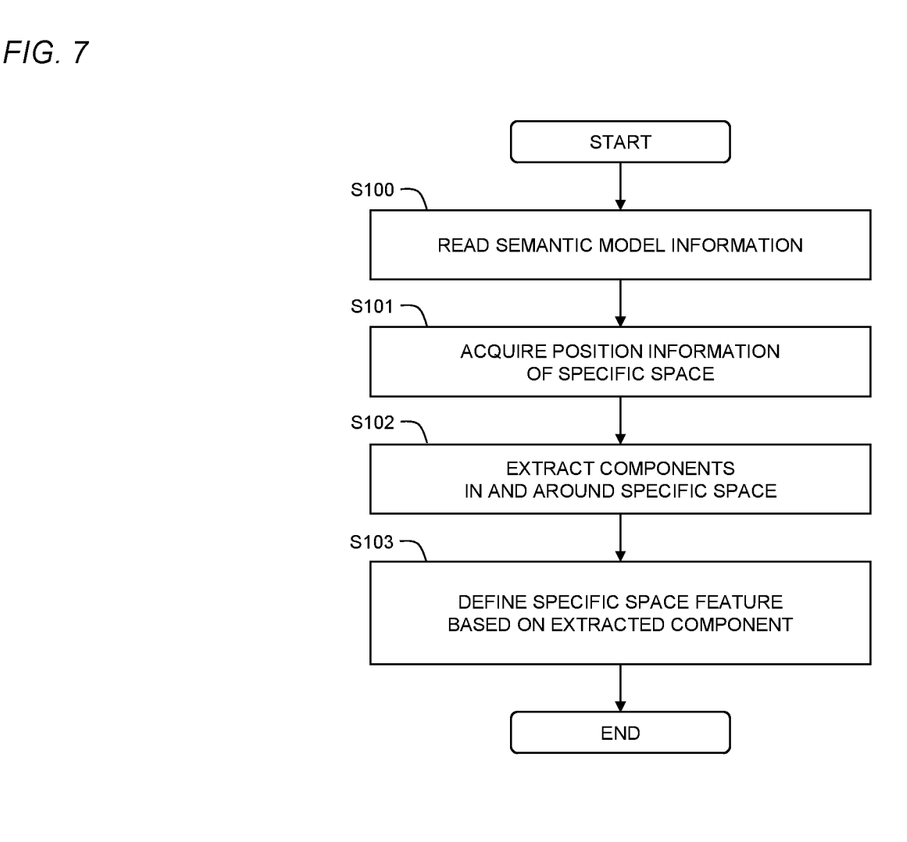
FIG. 7 is a flow chart showing a specific space definition process according to an embodiment of the present disclosure.

FIG. 7 is a flow chart showing the specific space definition process according to the present embodiment.

In Step S100, the processor 120 reads the semantic model information 300 regarding the world W being the analysis target from the memory device 130. Then, the processor 120 displays the semantic model of the world W on the user interface 110 (display device).

In Step S101, the processor 120 acquires position information of the specific space SX in the world W. For example, based on questionnaires and the like, the user grasps a position at which the moving body M exhibits the characteristic behavior. Then, the user specifies the specific space SX in the world W by the use of the user interface 110 (input device). Alternatively, the processor 120 may automatically specify the specific space SX. The processor 120 acquires the position information of the specified specific space SX based on the semantic model information 300.

In Step S102, the processor 120 extracts a plurality of components C present in and around the specific space SX based on the semantic model information 300. At this time, the processor 120 extracts the components C from the component extraction range RNG including the specific space SX (see FIG. 5). The processor 120 may extract only the components C that are in sight of the moving body M existing in the specific space SX.

In Step S103, the processor 120 acquires the attribute information of each of the extracted components C based on the semantic model information 300. Then, the processor 120 defines the specific space feature PX characterizing the specific space SX by the item set described above (see FIG. 4). The item set includes at least the attribute information of each of the extracted components C. The item set may include the positional relationship between the specific space SX and the extracted component C. The item set may include the positional relationship between the extracted components C. The item set may include, as supplementary information, the environmental condition under which the specific space SX is placed. The item set defining the specific space feature PX corresponds to factors causing the moving body M to exhibit the characteristic behavior.

In this manner, the processor 120 defines the specific space feature PX characterizing the specific space SX based on the semantic model information 300. The specific space feature information 400 indicates the specific space feature PX defined. It can also be said that the specific space feature information 400 represents the feature of the specific space SX. The specific space feature information 400 is stored in the memory device 130.

Using the semantic model information 300 makes it possible to define the specific space feature PX characterizing the specific space SX with high accuracy while suppressing the time and cost. That is, it is possible to efficiently and highly accurately define the specific space feature PX.

4. Similar Space Extraction Process

The specific space feature information 400 representing the feature of the specific space SX is useful. For example, referring to the specific space feature information 400 makes it possible to efficiently extract another space having a feature similar to that of the specific space SX. That is, once the feature of the specific space SX is defined, another space similar to the specific space SX can be efficiently extracted.

A space similar to the specific space SX is hereinafter referred to as a "similar space SY." The similar space SY is a space having the space feature P similar to the specific space feature PX characterizing the specific space SX. A process of extracting the similar space SY is hereinafter referred to as a "similar space extraction process."

Figure 8:
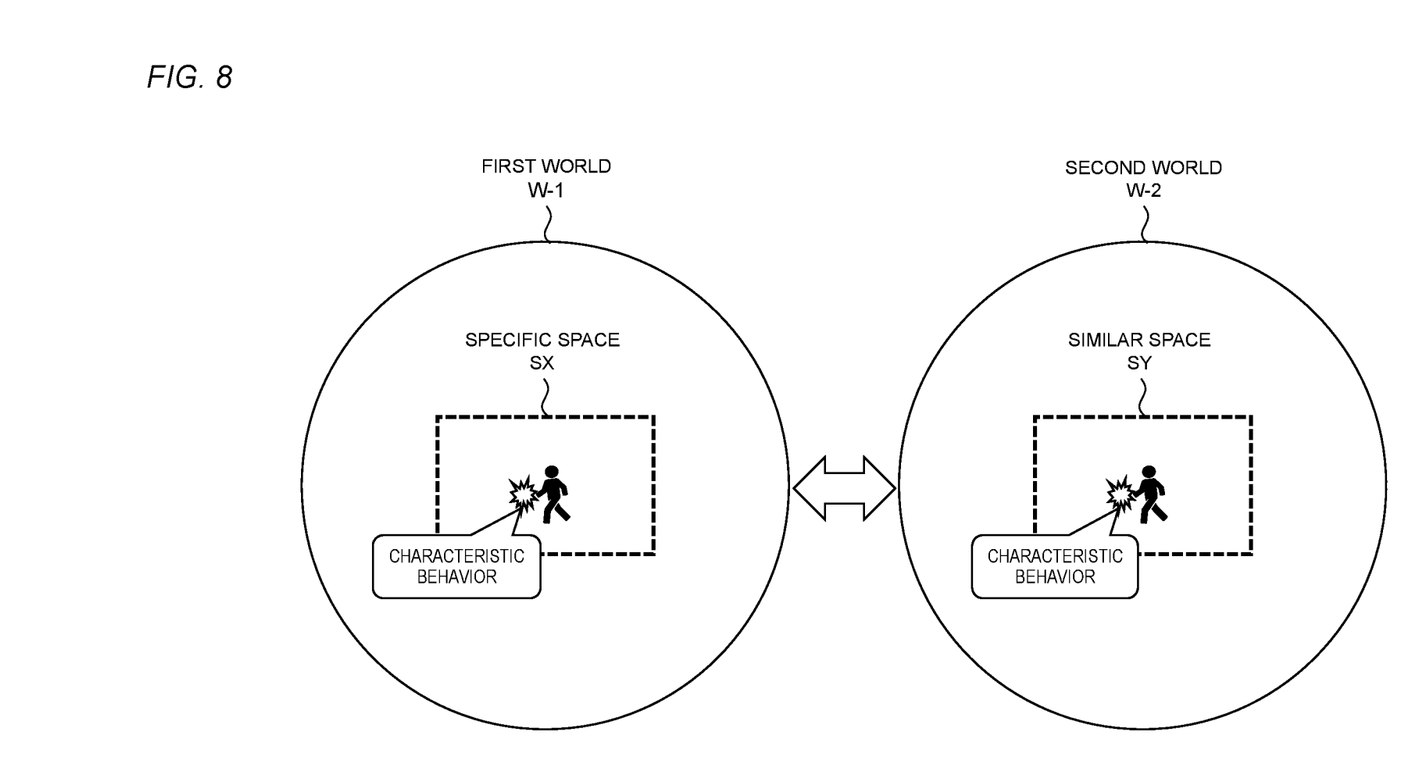
FIG. 8 is a conceptual diagram for explaining a similar space extraction process according to an embodiment of the present disclosure.

FIG. 8 is a conceptual diagram for explaining the similar space extraction process according to the present embodiment. A specific space SX exists in a first world W-1. The specific space SX in the first world W-1 is defined by the specific space definition process described above. A second world W-2 is a world from which a similar space SY is to be extracted. The second world W-2 may be the same as the first world W-1 or may be different from the first world W-1. A similar space SY similar to the specific space SX is extracted from the second world W-2. When the first world W-1 and the second world W-2 are the same, a similar space SY similar to the specific space SX is extracted from the same world W (e.g., a building).

Figure 9:
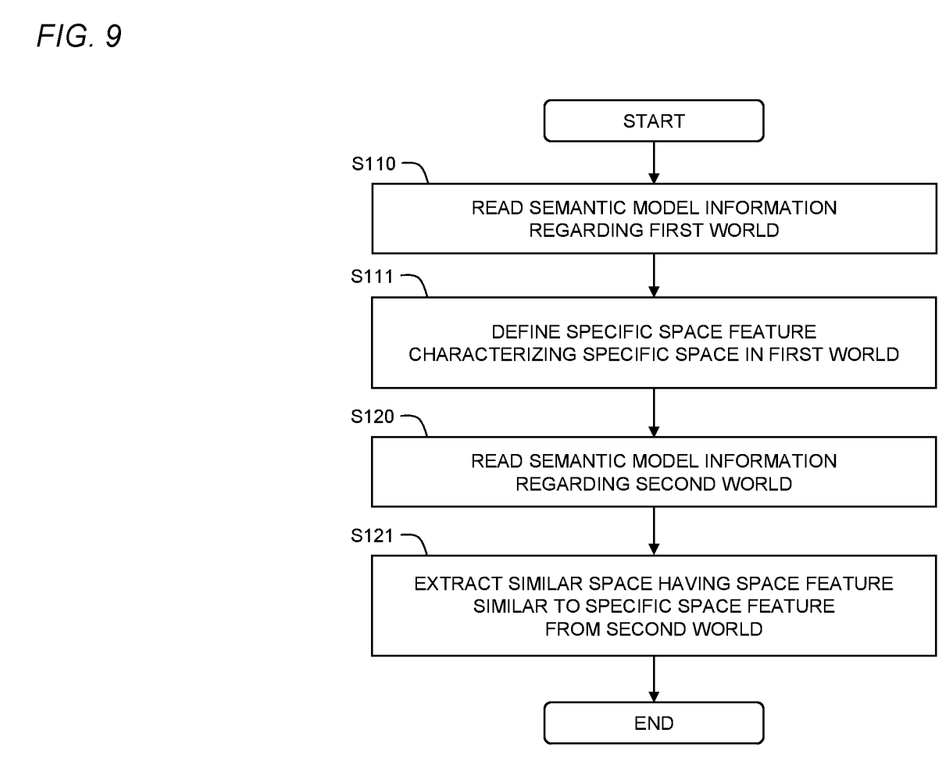
FIG. 9 is a flow chart showing a similar space extraction process according to an embodiment of the present disclosure.

FIG. 9 is a flow chart showing the similar space extraction process according to the present embodiment.

In Step S110, the processor 120 reads the semantic model information 300-1 regarding the first world W-1 from the memory device 130.

In Step S111, the processor 120 executes the specific space definition process that defines the specific space SX in the first world W-1 based on the semantic model information 300-1 regarding the first world W-1. The specific space definition process is as described in the above Section 3. Due to the specific space definition process, the specific space feature PX characterizing the specific space SX in the first world W-1 is defined. The specific space feature information 400 indicating the defined specific space feature PX is stored in the memory device 130.

In Step S120, the processor 120 reads the semantic model information 300-2 regarding the second world W-2 from the memory device 130.

In Step S121, the processor 120 extracts (searches for) a similar space SY similar to the specific space SX from the second world W-2, based on the semantic model information 300-2 regarding the second world W-2 and the specific space feature information 400. That is, the processor 120 extracts (searches for) a similar space SY having the space feature P similar to the specific space feature PX regarding the specific space SX in the first world W-1, from the second world W-2.

The fact that the space feature P regarding a comparison-target space in the second world W-2 is similar to the specific space feature PX regarding the specific space SX in the first world W-1 means that a degree of coincidence between the item set defining the specific space feature PX and the item set defining the space feature P is equal to or higher than a coincidence degree threshold. For example, the degree of coincidence is the number of coincident items in the item set.

As an example, it is assumed that the specific space feature PX regarding the specific space SX in the first world W-1 is defined by seven types of items D1, D2, D3, D4, D5, D6, and D7. On the other hand, it is assumed that the space feature P regarding the comparison-target space in the second world W-2 is defined by five types of items D1, D2, D3, D4, and D5. Then, the number of coincident items between the specific space feature PX regarding the specific space SX and the space feature P regarding the comparison-target space is calculated. In a case where the item includes a numerical value, two items may be determined to be coincident when a difference in the numerical value between the two items is less than a predetermined threshold. In the above example, it is assumed that the five types of items D1, D2, D3, D4, and D5 are coincident between the specific space feature PX regarding the specific space SX and the space feature P regarding the comparison-target space. In this case, the degree of coincidence is calculated as 5/7. When the coincidence degree threshold is 70%, the degree of coincidence is higher than the coincidence degree threshold, and thus it is determined that the comparison-target space is the similar space SY similar to the specific space SX. If only three types of items D1, D2, and D3 are coincident, the degree of coincidence is 3/7, and thus it is determined that the comparison-target space is not similar to the specific space SX.

As described above, using the specific space feature PX characterizing the specific space SX makes it possible to efficiently extract (search for) the similar space SY having the feature similar to that of the specific space SX. That is, once the feature of the specific space SX is defined, the similar space SY similar to the specific space SX can be efficiently extracted (searched). The second world W-2 in which the similar space SY is searched for is arbitrary. In various worlds, it is possible to efficiently recognize the spaces (i.e., the specific space SX and the similar space SY) where the moving body M exhibits the characteristic behavior. When such the spaces (i.e., the specific space SX and the similar space SY) can be found before actually constructing a building or a city, it is possible to improve the design in advance. This is useful in designing a city or a building that is comfortable for the moving body M.

5. Noise Elimination Process

The item set defining the specific space feature PX may include an item (noise) having little relation to the characteristic behavior of the moving body M. Accuracy of the specific space feature PX defined by the item set including such the item having low relevance is low. When the specific space feature PX with low accuracy is used, a space that is not similar to the specific space SX may be erroneously extracted as the similar space SY. In addition, a space that should be extracted as the similar space SY may not be correctly extracted. In order to suppress such the erroneous extraction and missing extraction, it is preferable to eliminate the item (noise) having little relation to the characteristic behavior of the moving body M from the item set. Such the process is hereinafter referred to as a "noise elimination process."

Figure 10:
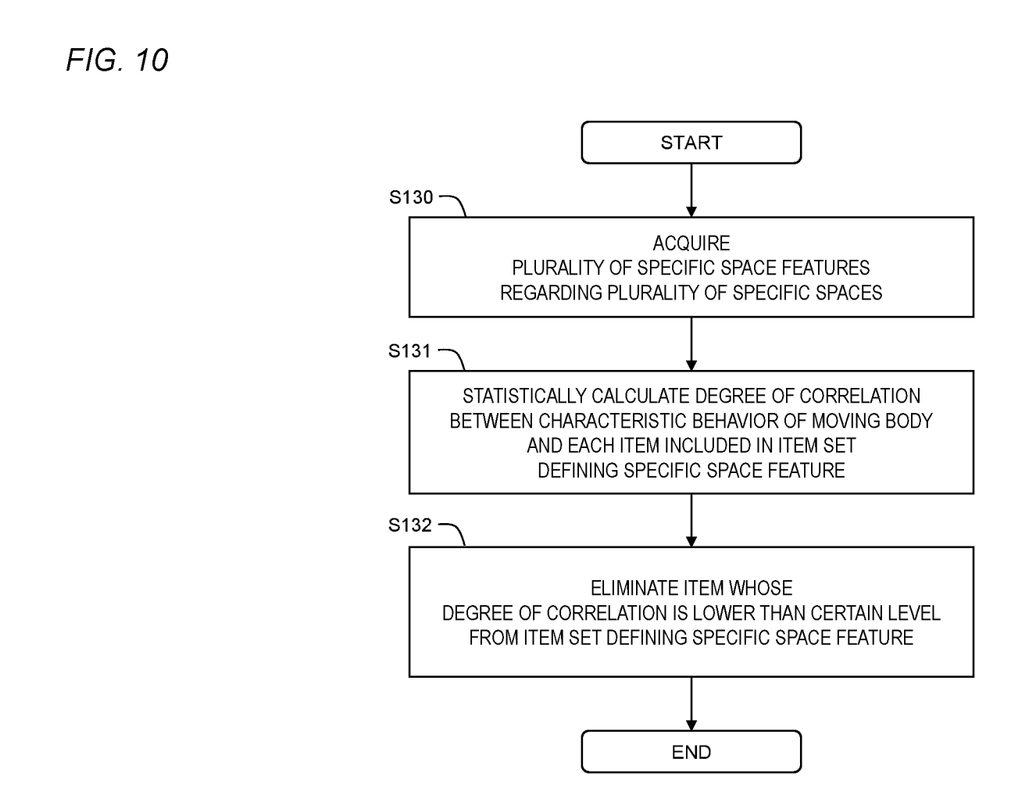
FIG. 10 is a flow chart showing a noise elimination process according to an embodiment of the present disclosure.

FIG. 10 is a flow chart showing the noise elimination process according to the present embodiment.

In Step S130, the processor 120 performs the specific space definition process described in the above Section 3 with respect to a plurality of specific spaces where the moving body M exhibits the same characteristic behavior (for example, a person hits a desk). Thereby, the processor 120 acquires a plurality of specific space features PX regarding the plurality of specific spaces.

In Step S131, based on the plurality of specific space features PX, the processor 120 statistically calculates a degree of correlation between "the characteristic behavior of the moving body M" and "each item included in the item set defining each of the plurality of specific space features PX." When a certain item is included in common in the plurality of specific space features PX, it can be said that the degree of correlation between the certain item and the characteristic behavior of the moving body M is considerably high. That is, as the number of specific space features PX including a certain item in common becomes larger, the degree of correlation between the certain item and the characteristic behavior of the moving body M becomes higher. Conversely, as the number of specific space features PX including a certain item in common becomes smaller, the degree of correlation between the certain item and the characteristic behavior of the moving body M becomes lower.

In Step S132, the processor 120 eliminates an item having the degree of correlation lower than a certain level from the item set defining the specific space feature PX regarding the specific space SX. In other words, the processor 120 redefines the specific space feature PX regarding the specific space SX by selectively using only items having the degree of correlation equal to or higher than the certain level.

By the noise elimination process described above, the item having little relation to the characteristic behavior of the moving body M is eliminated from the specific space feature PX. Therefore, the accuracy of the specific space feature PX is improved. As a result, the accuracy of the similar space extraction process (see Section 4) using the specific space feature PX is also improved. That is, the erroneous extraction and missing extraction of the similar space SY are suppressed.

When the number of items (factors) defining the specific space feature PX is reduced, each item can be analyzed in more detail. For example, a degree of influence can be calculated for each item. It may be also possible to identify an "essential factor" that surely causes the characteristic behavior of the moving body M. Once the essential factor is identified, it is also possible to consider a means for canceling the essential factor. For example, if insufficient illuminance is the essential factor, it is possible to consider a countermeasure such as installing another illumination.

What is claimed is:

1. An information processing device for analyzing a world in which a moving body moves,
the information processing comprising:
one or more processors;
and one or more memory devices storing semantic model information that is information on a semantic model of the world and indicates attribute information for each component constituting the world, wherein
a space feature characterizing a space in the world is defined by an item set that at least includes the attribute information of a plurality of components present in and around the space,
a specific space is a space where the moving body exhibits a characteristic behavior in the world, a specific space feature is the space feature characterizing the specific space, and the one or more processors are configured to:
extract, based on the semantic model information regarding a first world, a plurality of components present in and around the specific space in the first world to define the specific space feature by the item set; and
extract a similar space from a second world based on the semantic model information regarding the second world, the similar space having the space feature similar to the specific space feature regarding the specific space in the first world; wherein the one or more processors are further configured to:
acquire a plurality of specific space features regarding a plurality of specific spaces where the moving body exhibits the characteristic behavior;
statistically calculate, based on the plurality of specific space features, a degree of correlation between the characteristic behavior of the moving body and each item included in the item set; and
eliminate an item having the degree of correlation lower than a certain level from the item set defining the specific space feature.

2. The information processing device according to claim 1, wherein
the item set defining the space feature characterizing the space further includes a positional relationship between the space and at least one of the plurality of components.

3. The information processing device according to claim 1, wherein
the item set defining the space feature characterizing the space further includes a positional relationship between two or more of the plurality of components.

4. The information processing device according to claim 1, wherein
the item set defining the space feature characterizing the space further includes an environmental condition under which the space is placed.

5. The information processing device according to claim 1, wherein
the plurality of components used for defining the space feature characterizing the space are components that exist within a predetermined distance from a representative point in the space.

6. The information processing device according to claim 1, wherein
the plurality of components used for defining the space feature characterizing the space are components that are in sight of the moving body existing in the space.

7. The information processing device according to claim 1, wherein
a fact that the space feature regarding a space in the second world is similar to the specific space feature regarding the specific space in the first world means that a degree of coincidence between the item set defining the specific space feature and the item set defining the space feature is equal to or higher than a threshold.

8. An analysis method executed by a computer for analyzing a world in which a moving body moves, wherein
semantic model information is information on a semantic model of the world and indicates attribute information for each component constituting the world,
a space feature characterizing a space in the world is defined by an item set that at least includes the attribute information of a plurality of components present in and around the space,
a specific space is a space where the moving body exhibits a characteristic behavior in the world, and
a specific space feature is the space feature characterizing the specific space,
the analysis method comprising:
reading the semantic model information regarding a first world from one or more memory devices;
extracting, based on the semantic model information regarding the first world, a plurality of components present in and around the specific space in the first world to define the specific space feature by the item set;
reading the semantic model information regarding a second world from the one or more memory devices; and
extracting a similar space from the second world based on the semantic model information regarding the second world, the similar space having the space feature similar to the specific space feature regarding the specific space in the first world; wherein
acquiring a plurality of specific space features regarding a plurality of specific spaces where the moving body exhibits the characteristic behavior;

statistically calculating, based on the plurality of specific space features, a degree of correlation between the characteristic behavior of the moving body and each item included in the item set; and eliminating an item having the degree of correlation lower than a certain level from the item set defining the specific space feature.

9. A non-transitory computer-readable recording medium on which an analysis program executed by a computer is recorded, the analysis program being configured to cause the computer to execute an analysis process that analyzes a world in which a moving body moves, wherein semantic model information is information on a semantic model of the world and indicates attribute information for each component constituting the world, a space feature characterizing a space in the world is defined by an item set that at least includes the attribute information of a plurality of components present in and around the space, a specific space is a space where the moving body exhibits a characteristic behavior in the world, and a specific space feature is the space feature characterizing the specific space, the analysis process comprising:

reading the semantic model information regarding a first world from one or more memory devices;

extracting, based on the semantic model information regarding the first world, a plurality of components present in and around the specific space in the first world to define the specific space feature by the item set;

reading the semantic model information regarding a second world from the one or more memory devices; and extracting a similar space from the second world based on the semantic model information regarding the second world, the similar space having the space feature similar to the specific space feature regarding the specific space in the first world; wherein acquiring a plurality of specific space features regarding a plurality of specific spaces where the moving body exhibits the characteristic behavior;

statistically calculating, based on the plurality of specific space features, a degree of correlation between the characteristic behavior of the moving body and each item included in the item set; and eliminating an item having the degree of correlation lower than a certain level from the item set defining the specific space feature.

* * * * *